(12) United States Patent
Yamada et al.

(10) Patent No.: US 9,382,693 B2
(45) Date of Patent: Jul. 5, 2016

(54) WORK VEHICLE AND WORK VEHICLE CONTROL METHOD

(71) Applicant: KOMATSU LTD., Tokyo (JP)

(72) Inventors: Takeo Yamada, Komatsu (JP); Tomohiro Nakagawa, Hirakata (JP)

(73) Assignee: KOMATSU LTD., Tokyo (JP)

( * ) Notice: Subject to any disclaimer, the term of this patent is extended or adjusted under 35 U.S.C. 154(b) by 30 days.

(21) Appl. No.: 14/380,851

(22) PCT Filed: Apr. 28, 2014

(86) PCT No.: PCT/JP2014/061828
§ 371 (c)(1),
(2) Date: Aug. 25, 2014

(87) PCT Pub. No.: WO2014/192481
PCT Pub. Date: Dec. 4, 2014

(65) Prior Publication Data
US 2015/0345112 A1    Dec. 3, 2015

(51) Int. Cl.
*E02F 9/22* (2006.01)
*E02F 9/14* (2006.01)
(Continued)

(52) U.S. Cl.
CPC ............. *E02F 9/2221* (2013.01); *E02F 9/14* (2013.01); *E02F 9/2012* (2013.01); *E02F 9/2282* (2013.01); *E02F 9/2285* (2013.01); *E02F 9/2292* (2013.01); *F15B 11/10* (2013.01); *F15B 13/0401* (2013.01); *F15B 21/08* (2013.01);
(Continued)

(58) Field of Classification Search
CPC ..... E02F 9/2285; E02F 9/2235; E02F 9/2246; E02F 9/2278; F15B 2211/6313; F15B 2211/665; F15B 2211/353; F15B 2211/6336; F15B 2211/7107; B60P 1/162; F03C 1/06; G05B 2219/45012
USPC ............. 701/50; 137/47, 12, 637.1; 180/53.4; 37/414; 414/722
See application file for complete search history.

(56) References Cited

U.S. PATENT DOCUMENTS

| | | | | |
|---|---|---|---|---|
| 6,546,325 B1 * | 4/2003 | Kubota | ................. | E02F 9/2239 60/468 |
| 2005/0177292 A1 * | 8/2005 | Okamura | .............. | E02F 9/2207 701/50 |

FOREIGN PATENT DOCUMENTS

| | | |
|---|---|---|
| CN | 201538977 U | 8/2010 |
| CN | 102102370 A | 6/2011 |

(Continued)

OTHER PUBLICATIONS

The international search report for the corresponding international application No. PCT/JP2014/061828, issued on Aug. 19, 2014.

*Primary Examiner* — Marthe Marc-Coleman
(74) *Attorney, Agent, or Firm* — Global IP Counselors, LLP

(57) ABSTRACT

A hydraulic excavator is provided with an arm cylinder, an arm switching valve, a sixth pilot pressure control valve, a sixth electromagnetic proportional valve, a sixth upstream pilot flow path, a sixth hydraulic pressure sensor, and a control section. The control section selects at least one item of current value information from a plurality of items of current value information on the basis of a hydraulic pressure that is detected by the sixth hydraulic pressure sensor. The control section is configured to set a current value of a current that is output to the sixth electromagnetic proportional valve on the basis of the current value information that is selected.

14 Claims, 7 Drawing Sheets

(51) Int. Cl.

| | | |
|---|---|---|
| *F15B 11/10* | (2006.01) | |
| *F15B 13/04* | (2006.01) | |
| *F16K 31/42* | (2006.01) | |
| *G05D 7/06* | (2006.01) | |
| *E02F 9/20* | (2006.01) | |
| *F15B 21/08* | (2006.01) | |

(52) U.S. Cl.
CPC ............. *F16K 31/42* (2013.01); *G05D 7/0641* (2013.01); *F15B 2211/575* (2013.01); *F15B 2211/6316* (2013.01); *F15B 2211/6346* (2013.01); *F15B 2211/6355* (2013.01); *F15B 2211/6653* (2013.01); *F15B 2211/67* (2013.01); *Y10T 137/0379* (2015.04); *Y10T 137/87113* (2015.04)

(56) References Cited

FOREIGN PATENT DOCUMENTS

| | | |
|---|---|---|
| CN | 201962707 U | 9/2011 |
| JP | 8-85974 A | 4/1996 |
| JP | 8-177085 A | 7/1996 |
| JP | 8-333778 A | 12/1996 |
| JP | 9-105152 A | 4/1997 |

* cited by examiner ated on Apr. 28, 2014.

WORK VEHICLE AND WORK VEHICLE CONTROL METHOD

CROSS-REFERENCE TO RELATED APPLICATIONS

This application is a U.S. National stage application of International Application No. PCT/JP2014/061828, filed on Apr. 28, 2014.

BACKGROUND

1. Field of the Invention

The present invention relates to a work vehicle and a work vehicle control method.

2. Background Information

A work vehicle drives a work implement and performs desired work. For example, the work implement of a hydraulic excavator has an arm, a boom, and a bucket. The arm, the boom, and the bucket are each driven by a hydraulic cylinder. By supplying hydraulic oil to each of the cylinders, the respective cylinders drive the arm, the boom, and the bucket. In detail, switching valves are connected with each of the cylinders and the supply direction of the hydraulic oil to each of the cylinders is switched by each of the switching valves. Due to this, the respective cylinders expand and contract to drive the arm, the boom, and the bucket.

Each of the switching valves is driven using a pilot pressure that is controlled according to a pilot pressure control valve. Here, the pilot pressure control valve controls the pilot pressure that depends on an operation amount of an operation lever. An electromagnetic proportional valve is installed between the pilot pressure control valve and each pilot port in each of the switching valves. Then, automatic control of each of the cylinders is possible by the control section controlling the electromagnetic proportional valve on the basis of the pilot pressure that is applied from the pilot pressure control valve (refer to Japanese Unexamined Patent Application Publication No. H9-105152). For example, the electromagnetic proportional valve is opened and closed by the control section controlling a current value of a current that is output to the electromagnetic proportional valve and it is possible to automatically control each of the cylinders as a result. Here, automatic control is a concept that also encompasses automatic control that includes work by an operator as a portion of the automatic control.

By automatically controlling each of the cylinders as described above, it is possible to automatically control the work implement. However, in a case where a configuration is adopted such that the electromagnetic proportional valve is installed between the pilot pressure control valve and each of the pilot ports of each of the switching valves and the control section controls the electromagnetic proportional valve on the basis of the pilot pressure that is applied from the pilot pressure control valve, there is a concern that the work implement will not be appropriately automatically controlled when the pilot pressure changes due to operation of the operation lever. For example, when control is executed in the hydraulic excavator to move a cutting edge of the bucket along a designed surface, the boom moves upward more than necessary when the operation amount of the operation lever increases and there are times when the cutting surface moves above the designed surface.

The present invention provides a work vehicle that is able to appropriately automatically control a work implement.

A work vehicle according to a first aspect of the present invention is provided with a work implement, a switching valve, an operation member, a pilot pressure control valve, an electromagnetic proportional valve, an upstream pilot flow path, a pressure sensor, and a control section. The switching valve is configured to switch a supply direction of a first hydraulic fluid which is supplied to the work implement. The operation member is configured to operate the work implement. The pilot pressure control valve is configured to control pressure of a second hydraulic fluid that drives the switching valve according to an operation amount of the operation member. The electromagnetic proportional valve is installed between the switching valve and the pilot pressure control valve. The upstream pilot flow path connects the pilot pressure control valve and the electromagnetic proportional valve. The pressure sensor is configured to detect pressure of the second hydraulic fluid inside the upstream pilot flow path. The control section selects at least one item of current value information from a plurality of items of current value information on the basis of the pressure that is detected by the pressure sensor. The control section is configured to set a current value of a current that is output to the electromagnetic proportional valve on the basis of the current value information that is selected. The current value information expresses a correspondence relationship between the current value of the current that is output to the electromagnetic proportional valve and the pressure of the second hydraulic fluid that is output from the electromagnetic proportional valve.

According to this configuration, the control section selects at least one item of current value information from the plurality of items of current value information on the basis of the pressure that is detected by the pressure sensor. Then, the control section sets the current value of the current that is output to the electromagnetic proportional valve on the basis of the current value information which is selected. As a result, the electromagnetic proportional valve is driven using a current with a more appropriate current value. As a result, a more appropriate pilot pressure is applied to the switching valve and the work implement is appropriately automatically controlled.

Typically, the pressure of the hydraulic fluid that is input into the electromagnetic proportional valve (the input pressure) and the pressure of the hydraulic fluid that is output from the electromagnetic proportional valve (the output pressure) are not limited to being equal. In detail, when the input pressure is different, there are cases where the output pressure is different even when a current with the same current value is output to the electromagnetic proportional valve. The control section estimates the operation speed of the work implement according to the input pressure. As a result, in a case where, for example, the input pressure is higher than the output pressure, the operation speed of the work implement that is estimated by the control section is faster than the actual operation speed of the work implement.

The following phenomena occur due to the above phenomena in a case of performing work where terrain is leveled along a designed surface using a hydraulic excavator. The operator performs an excavation operation with the arm and performs a lowering operation of the boom such that the cutting edge of the bucket moves along the designed surface. Here, the control section performs control, which raises the boom when it is determined that there is a high possibility that the cutting edge will be moved below the designed surface. When the operation speed of the arm, which is estimated by the control section, is faster than the actual operation speed of the arm, a phenomenon occurs where the control section moves the boom upward more than necessary and the cutting edge moves above the designed surface. This phenomenon is particularly likely to occur due to, for example, the pilot pressure increasing when an arm operation lever is further tilted to increase the speed of the work.

The control section according to the present invention sets the current value of the current that is output to the electromagnetic proportional valve on the basis of the appropriate current value information that corresponds to the input pressure as described above. As a result, it is possible for, for example, the pressure of the second hydraulic fluid that is input into the electromagnetic proportional valve and the pressure of the second hydraulic fluid that is output from the electromagnetic proportional valve to be substantially equal. As a result, the operation speed of the work implement, which is estimated by the control section, and the actual operation speed of the work implement are substantially equal. Accordingly, it is possible for the work vehicle according to the present invention to appropriately automatically control the work implement.

It is preferable that the control section be configured to set the current value that is output to the electromagnetic proportional valve on the basis of the at least one item of current value information that is selected such that the pressure of the second hydraulic fluid that is output from the electromagnetic proportional valve is equal to the pressure that is detected by the pressure sensor.

It is preferable that the plurality of items of current value information be items of information that are set for each of a plurality of specific pressures that are input into the electromagnetic proportional valve. The control section selects at least one item of current value information on the specific pressures, which are close to the pressure that is detected by the pressure sensor, from the plurality of items of current value information. The control section sets the current value of the current that is output to the electromagnetic proportional valve on the basis of the at least one item of current value information that is selected.

It is preferable that the control section be configured to select a first item of current value information from the plurality of items of current value information when the pressure that is detected by the pressure sensor is a first pressure. In addition, the control section is configured to select a second item of current value information from the plurality of items of current value information when the pressure that is detected by the pressure sensor is a second pressure. The control section sets the current value of the current that is output to the electromagnetic proportional valve using interpolation when the pressure that is detected by the pressure sensor is between the first pressure and the second pressure.

It is preferable that the control section set the current value of the current that is output to the electromagnetic proportional valve using linear interpolation when the pressure that is detected by the pressure sensor is between the first pressure and the second pressure.

It is preferable that the control section select the first and second items of current value information from the plurality of items of current value information when the pressure that is detected by the pressure sensor is between the first pressure and the second pressure. Then, the control section sets the current value of the current that is output to the electromagnetic proportional valve using interpolation of the current value that is set based on the first item of current value information and the current value that is set based on the second item of current value information.

It is preferable that the work implement have a cylinder that is driven by the first hydraulic fluid. The switching valve is configured to switch the supply direction of the first hydraulic fluid that is supplied to the cylinder.

It is preferable that the work implement be further provided with a vehicle body. The work implement has a boom, an arm, a boom cylinder, and an arm cylinder. The boom is attached to the vehicle body to be able to rotate. The arm is attached to the boom to be able to rotate. The boom cylinder is configured to drive the boom. The arm cylinder is configured to drive the arm. The switching valve is configured to switch the supply direction of the first hydraulic fluid that is supplied to the arm cylinder.

A work vehicle according to a second aspect of the present invention is provided with a work implement, a switching valve, an operation member, a pilot pressure control valve, an electromagnetic proportional valve, an upstream pilot flow path, a pressure sensor, and a control section. The switching valve is configured to switch a supply direction of a first hydraulic fluid that is supplied to the work implement. The operation member is configured to operate the work implement. The pilot pressure control valve is configured to control pressure of a second hydraulic fluid that drives the switching valve according to an operation amount of the operation member. The electromagnetic proportional valve is installed between the switching valve and the pilot pressure control valve. The upstream pilot flow path connects the pilot pressure control valve and the electromagnetic proportional valve. The pressure sensor is configured to detect pressure of the second hydraulic fluid inside the upstream pilot flow path. The control section selects at least one item of current value information from a plurality of items of current value information on the basis of the pressure that is detected by the pressure sensor. The control section is configured to set a current value of a current that is output to the electromagnetic proportional valve on the basis of the current value information that is selected. The current value information expresses a correspondence relationship between a current value of a current that is input to the electromagnetic proportional valve and pressure of the second hydraulic fluid that is output from the electromagnetic proportional valve.

A control method according to a third aspect of the present invention is a method for controlling a work implement of a work vehicle. The control method includes steps (a) to (c). Step (a) is acquiring a pressure signal that indicates pressure of a second hydraulic fluid that is supplied from a pilot pressure control valve to an electromagnetic proportional valve. Step (b) is selecting at least one item of current value information from a plurality of items of current value information on the basis of the pressure that is acquired in step (a). Here, the current value information expresses a correspondence relationship between a current value of a current that is output to the electromagnetic proportional valve and pressure of the second hydraulic fluid that is output from the electromagnetic proportional valve. Step (c) is setting the current value of the current that is output to the electromagnetic proportional valve on the basis of the current value information that is selected in step (b).

It is preferable that the control method further include steps (d) to (f). Step (d) is controlling the electromagnetic proportional valve by outputting the current value that is set in step (c) to the electromagnetic proportional valve. Step (e) is applying a pilot pressure to a switching valve using the second hydraulic fluid that is output from the electromagnetic proportional valve that is controlled in step (d). Step (f) is switching a supply direction of a first hydraulic fluid that is supplied to the work implement on the basis of the pilot pressure that is applied in step (e).

According to the present invention, it is possible to appropriately automatically control a work implement.

DESCRIPTION OF THE EXEMPLARY EMBODIMENTS

Figure 1:
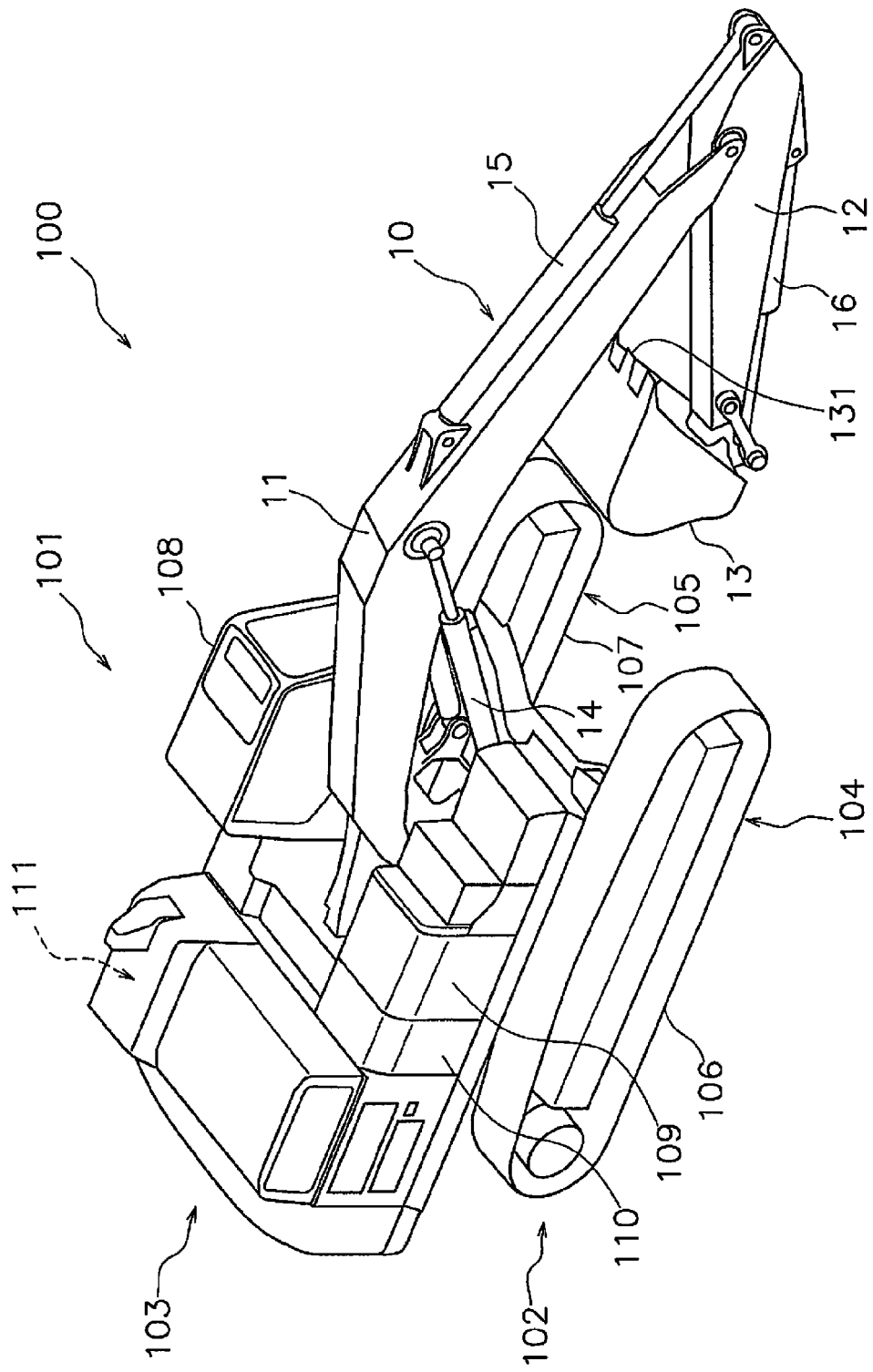
FIG. 1 is a perspective diagram of a hydraulic excavator.

Below, a hydraulic excavator 100, which is an exemplary embodiment of a work vehicle, according to the present invention will be described with reference to the diagrams. FIG. 1 is a perspective diagram of the hydraulic excavator 100. Here, "front" and "back" in the following description have the meaning of the front and back of a vehicle body 101. In addition, "right", "left", "up", and "down" in the following description indicate directions with a state of looking forward from the driver's seat as a reference. The "vehicle width direction" and the "left and right direction" have the same meaning.

As shown in FIG. 1, the hydraulic excavator 100 is provided with the vehicle body 101 and a work implement 10. The hydraulic excavator 100 performs desired work using the work implement 10.

The vehicle body 101 has an undercarriage 102 and a revolving body 103. The undercarriage 102 has a pair of travel devices 104 and 105. The travel device 104 has a crawler belt 106 and the travel device 105 has a crawler belt 107. The travel devices 104 and 105 move the hydraulic excavator 100 by receiving a driving force from an engine 30 and driving each of the crawler belts 106 and 107.

The revolving body 103 is mounted on the undercarriage 102 and provided to be able to revolve with regard to the undercarriage 102. The revolving body 103 has a cab 108, a fuel tank 109, a hydraulic oil tank 110, and an engine compartment 111.

Figure 5:
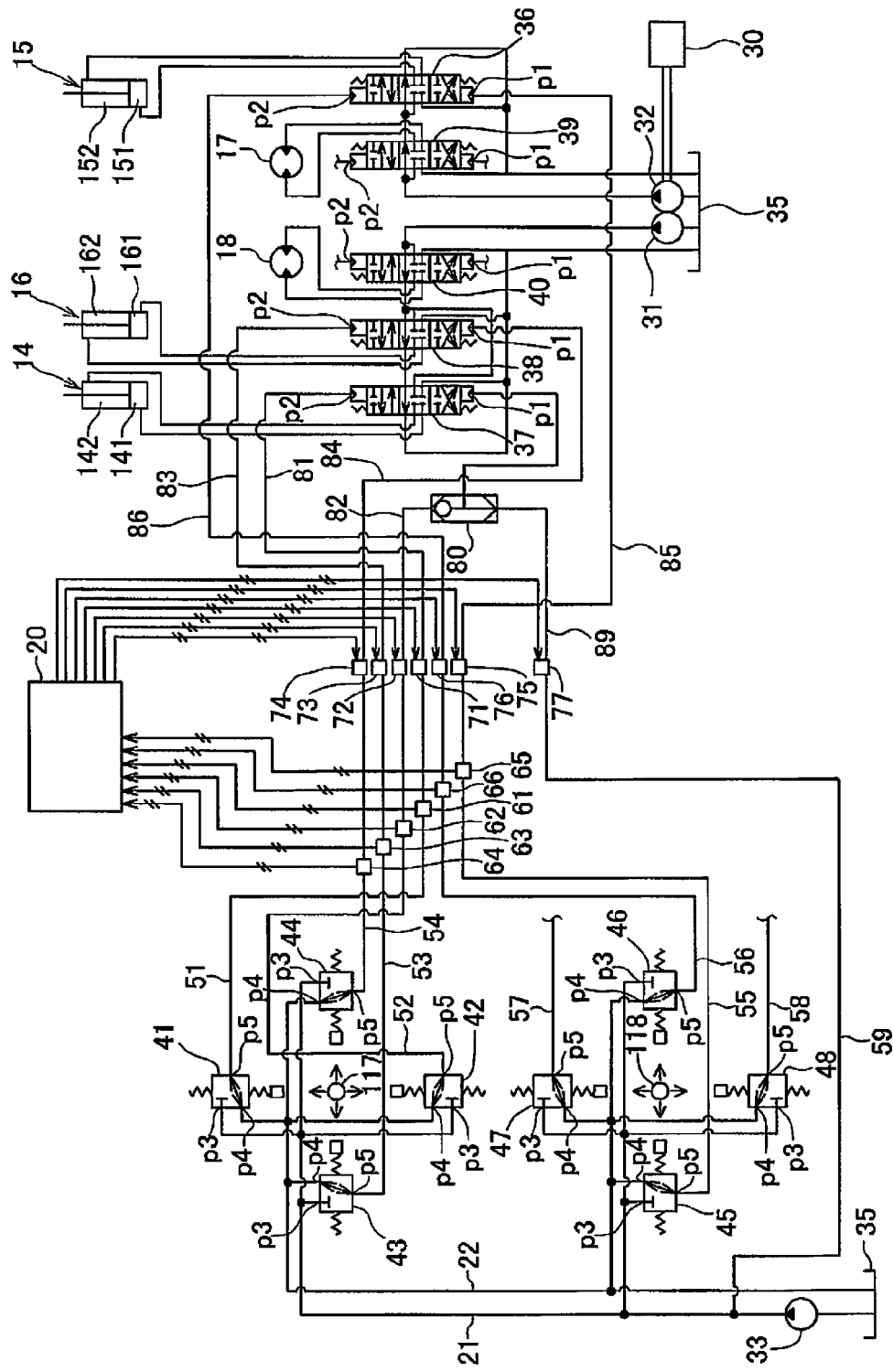
FIG. 5 is a hydraulic circuit diagram of a hydraulic excavator.

The fuel tank 109 retains fuel for driving the engine 30 (refer to FIG. 5). The fuel tank 109 is arranged in front of the hydraulic oil tank 110. The hydraulic oil tank 110 retains hydraulic oil. The hydraulic oil tank 110 is arranged to line up with the fuel tank 109 in the front and back direction.

The engine compartment 111 accommodates the engine 30, first to third hydraulic pumps 31 to 33, and the like. The engine compartment 111 is arranged behind the cab 108, the fuel tank 109, and the hydraulic oil tank 110.

The work implement 10 is attached to the front section of the revolving body 103. The work implement 10 is driven by hydraulic oil. The work implement 10 has a boom 11, an arm 12, a bucket 13, boom cylinders 14, an arm cylinder 15, and a bucket cylinder 16. Here, the work implement 10 of the present exemplary embodiment has a pair of the boom cylinders 14.

The proximal end of the boom 11 is joined to the revolving body 103 to be able to rotate. In addition, the proximal end of the arm 12 is joined to the distal end of the boom 11 to be able to rotate. The bucket 13 is joined to the distal end of the arm 12 to be able to rotate. Each of the boom cylinders 14, the arm cylinder 15, and the bucket cylinder 16 are hydraulic cylinders and are driven using hydraulic oil. Each of the cylinders 14 to 16 is driven by hydraulic oil that is discharged from the first hydraulic pump 31, which will be described later. Each of the boom cylinders 14 operates the boom 11. The arm cylinder 15 operates the arm 12. The bucket cylinder 16 operates the bucket 13. The work implement 10 is driven by the cylinders 14 to 16 being driven.

Figure 2:
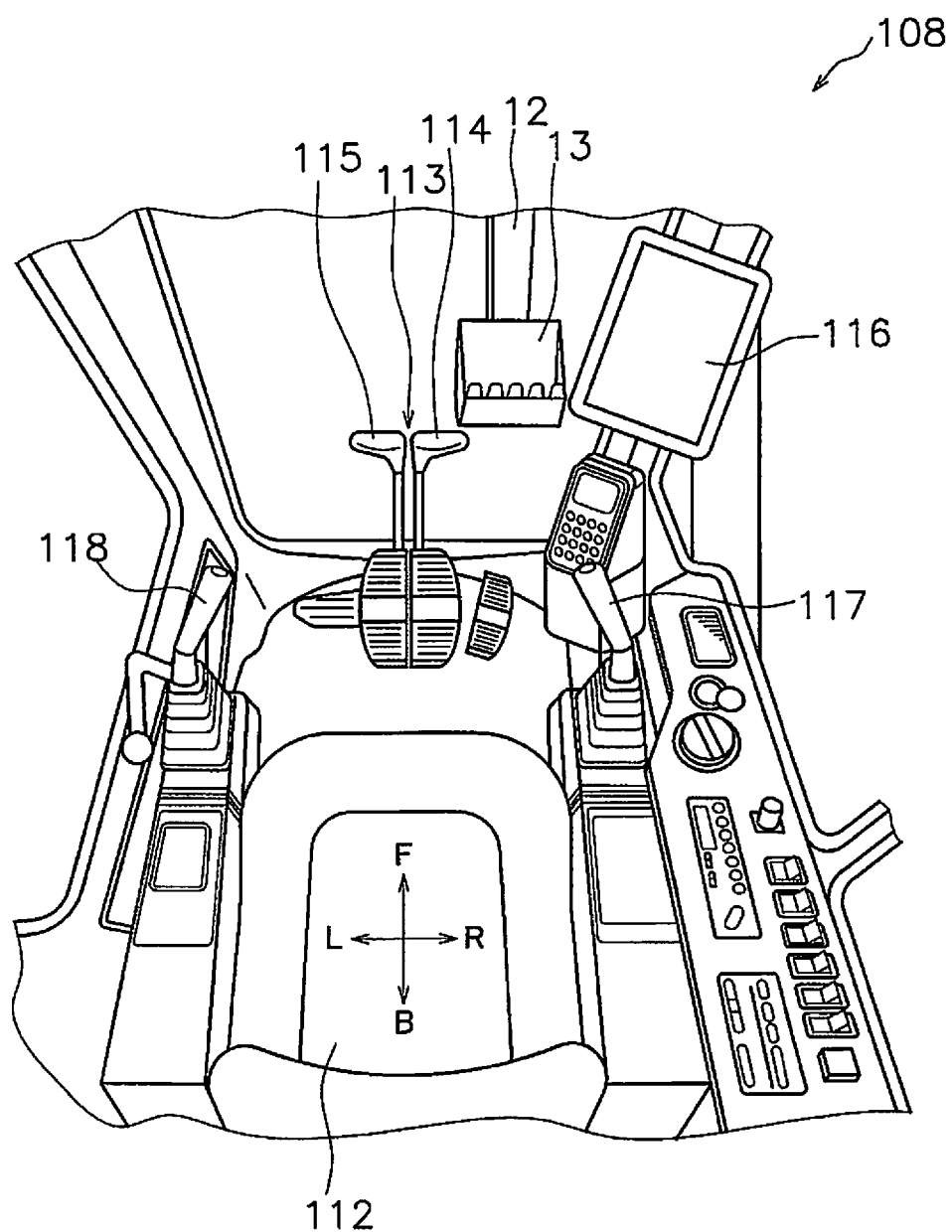
FIG. 2 is a perspective diagram of a cab interior.

FIG. 2 is a perspective diagram illustrating the interior of the cab 108. As shown in FIG. 2, a driver's seat 112 is installed in the interior of the cab 108. A front window is formed in the front section of the cab 108. The front window is transparent. As a result, the operator who is seated in the driver's seat 112 is able to see outside of the cab 108 via the front window. For example, it is possible for the operator to check the bucket 13 via the front window.

A monitoring apparatus 116 is installed in the front section inside the cab 108. The monitoring apparatus 116 is arranged at the right front section or the left front section inside the cab 108. Here, the monitoring apparatus 116 according to the present exemplary embodiment is arranged at the right front section. For example, the monitoring apparatus 116 is attached to a front pillar. As a result, it is possible for the operator to easily view both the work implement 10 and the monitoring apparatus 116.

A travel operation section 113 is installed inside the cab 108 in front of the driver's seat 112. The travel operation section 113 is provided with a right travel operation lever 114 and a left travel operation lever 115. The right travel operation lever 114 operates the travel device 104, which is on the right side, and the left travel operation lever 115 operates the travel device 105, which is on the left side.

A first operation lever 117 is installed on the right side of the driver's seat 112. The operator drives the boom 11 and the bucket 13 of the work implement 10 by operating the first operation lever 117. A second operation lever 118 is installed on the left side of the driver's seat 112. The operator drives the arm 12 of the work implement 10 and revolves the revolving body 103 by operating the second operation lever 118.

Figure 3:
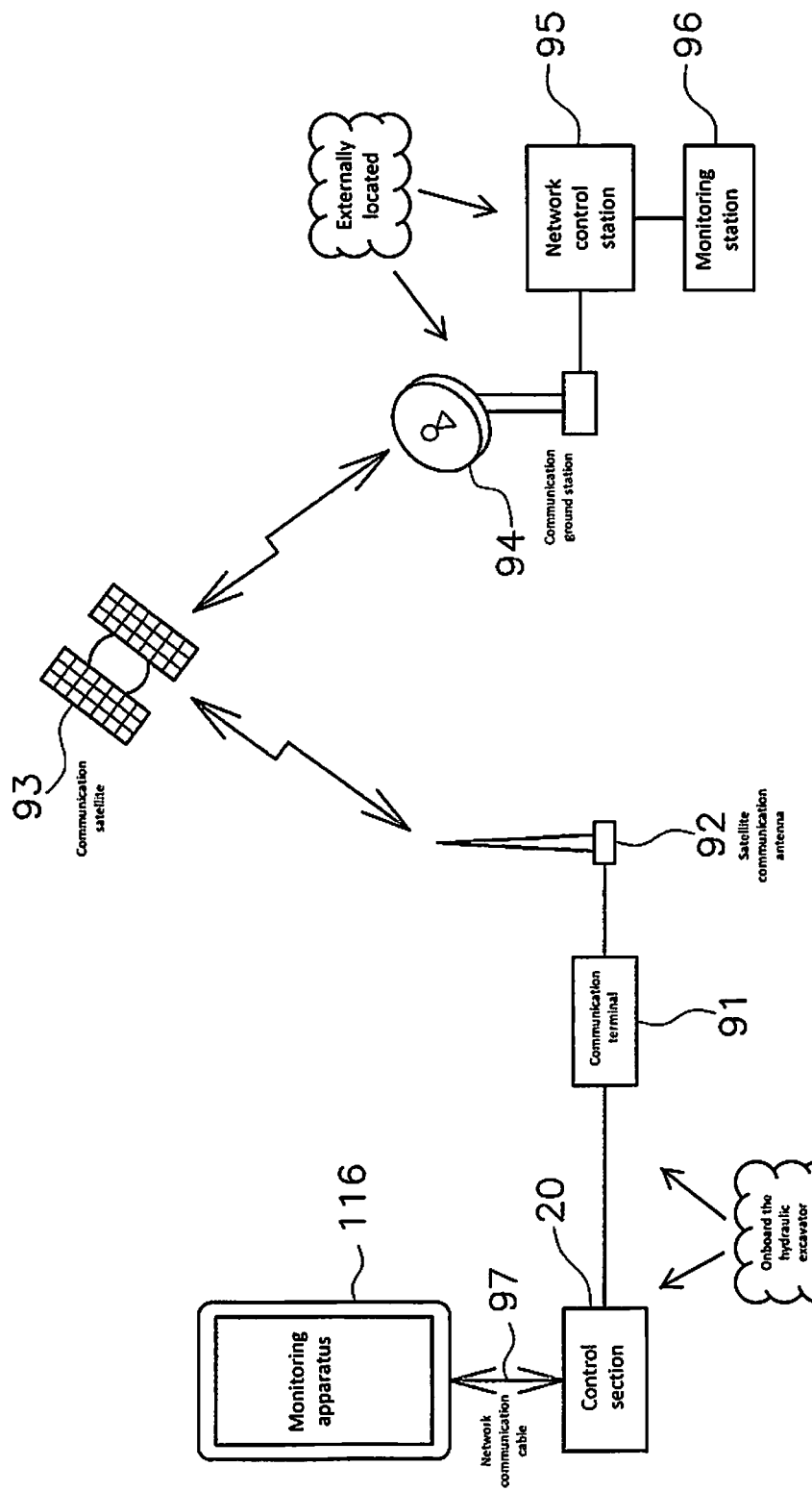
FIG. 3 is a schematic diagram of a configuration where transmission and reception of information are performed in the hydraulic excavator.

FIG. 3 is a schematic diagram of a configuration where transmission and reception of information are performed in the hydraulic excavator 100. As shown in FIG. 3, the hydraulic excavator 100 is provided with a control section 20, a communication terminal 91, and an antenna 92. The control section 20 controls operation of the work implement 10, revolving of the revolving body 103, traveling of the undercarriage 102, and the like. The control section 20 and the monitoring apparatus 116 are connected via a bidirectional network communication cable 97. It is possible for the control section 20 and the monitoring apparatus 116 to transmit and receive information to and from each other via the network communication cable 97. Here, the control section 20 and the monitoring apparatus 116 are each mainly configured by a computer apparatus, such as a microcomputer.

It is possible to transmit and receive information between the control section 20 and an external monitoring station 96. In the present exemplary embodiment, the control section 20 and the external monitoring station 96 communicate via satellite communication. The communication terminal 91, which has the satellite communication antenna 92, is connected with the control section 20. The satellite communication antenna 92 is installed in the revolving body 103.

A network control station 95 is connected with the monitoring station 96 on the ground via the Internet or the like. The network control station 95 is connected by a dedicated line with a communication ground station 94, which communicates with a communication satellite 93, using a dedicated communication line. Due to this, data is transmitted and received between the control section 20 and the monitoring station 96, which is predetermined, through the communication terminal 91, the communication satellite 93, the communication ground station 94, and the network control station 95.

Earth moving design data, which is created using three-dimensional computer aided design (CAD), is saved in the control section 20. The monitoring apparatus 116 displays the position of the hydraulic excavator 100, which is received from outside on a screen in real time. As a result, it is possible for the operator to continually check the work state of the hydraulic excavator 100 using the monitoring apparatus 116.

Figure 4:
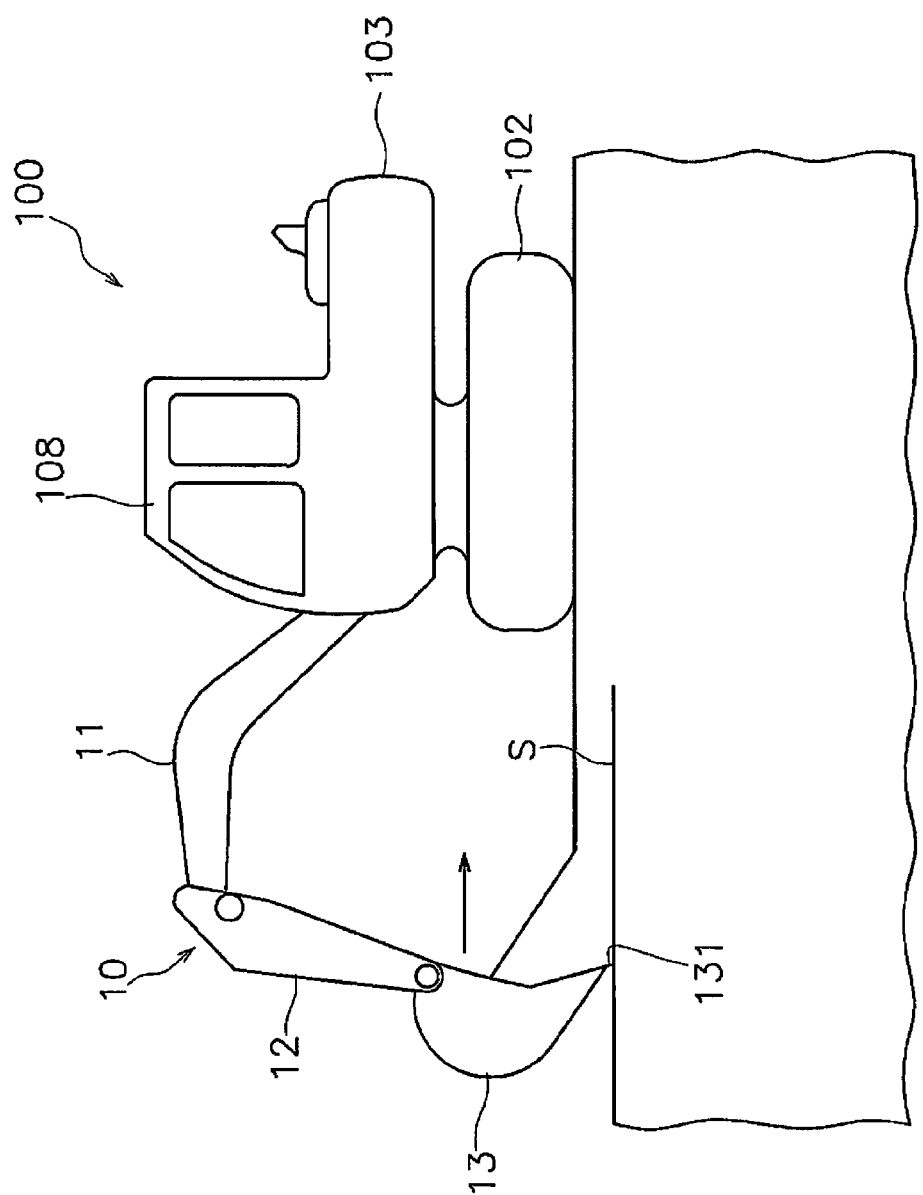
FIG. 4 is a schematic diagram illustrating work by a hydraulic excavator.

The control section 20 compares the earth moving design data with the position and posture of the work implement 10 in real time. Then, the control section 20 controls the work implement 10 by driving of the hydraulic circuit on the basis of the result of the comparison. In detail, the control section 20 compares a designed surface S with the position of the bucket 13, as shown in FIG. 4. Then, the control section 20 controls the work implement 10 such that the cutting edge 131 of the bucket 13 is not positioned lower than the designed surface S in order not to dig past the designed surface. Here, the designed surface S has the meaning of a surface that is to be formed by carrying out earth moving in accordance with earth moving design data.

FIG. 5 is a hydraulic circuit diagram of the hydraulic excavator 100. As shown in FIG. 5, the hydraulic excavator 100 is provided with the engine 30, the plurality of hydraulic pumps 31 to 33, the plurality of cylinders 14 to 16, traveling motors 17 and 18, a plurality of switching valves 36 to 40, a plurality of pilot pressure control valves 41 to 48, the control section 20, a plurality of hydraulic sensors (examples of a pressure sensor) 61 to 66, and a plurality of electromagnetic proportional valves 71 to 77.

Here, the hydraulic excavator 100 has the first to third hydraulic pumps 31 to 33 as the plurality of hydraulic pumps. In addition, the hydraulic excavator 100 has the boom cylinder 14, the arm cylinder 15, and the bucket cylinder 16 described above as the plurality of cylinders. In addition, the hydraulic excavator 100 has an arm switching valve 36, a boom switching valve 37, a bucket switching valve 38, a right traveling switching valve 39, and a left traveling switching valve 40 as the plurality of switching valves. In addition, the hydraulic excavator 100 has the first to eighth pilot pressure control valves 41 to 48 as the plurality of pilot pressure control valves. In addition, the hydraulic excavator 100 has the first to sixth hydraulic sensors 61 to 66 as the plurality of hydraulic sensors. In addition, the hydraulic excavator 100 has the first to seventh electromagnetic proportional valves 71 to 77 as the plurality of electromagnetic proportional valves.

The first to third hydraulic pumps 31 to 33 are driven by the engine 30. The first and second hydraulic pumps 31 and 32 drive each hydraulic pressure actuator, such as the boom cylinder 14, the arm cylinder 15, the bucket cylinder 16, and the traveling motors 17 and 18. In detail, hydraulic oil (an example of the first hydraulic fluid) that is discharged by the first and second hydraulic pumps 31 and 32 is supplied to each of the hydraulic pressure actuators via the respective switching valves 36 to 40. Due to this, each of the hydraulic pressure actuators is driven. Here, the hydraulic oil that is discharged from each of the hydraulic pressure actuators is discharged to a tank 35 via the respective switching valves 36 to 40. Here, the hydraulic oil which is supplied to each of the hydraulic actuators in the following description is referred to as the first hydraulic oil.

The third hydraulic pump 33 discharges hydraulic oil (an example of the second hydraulic fluid) for applying a pilot pressure to each of the switching valves 36 to 40. In detail, the pressure of the hydraulic oil that is discharged by the third hydraulic pump 33 is reduced by each of the pilot pressure control valves 41 to 46. Then, the hydraulic oil, where the pressure is reduced, applies a pilot pressure to each of pilot ports p1 and p2 in each of the switching valves 36 to 40. Here, the hydraulic oil that applies the pilot pressure to each of the switching valves 36 to 40 in the following description is referred to as the second hydraulic oil.

Each of the switching valves 36 to 40 is configured to switch the supply direction of the first hydraulic oil that is supplied to the respective hydraulic pressure actuators. In detail, each of the switching valves 36 to 40 respectively has the first and second pilot ports p1 and p2. Each of the switching valves 36 to 40 is driven by applying a pilot pressure to the first or second pilot ports p1 and p2.

The arm switching valve 36 is configured to switch the supply direction of the first hydraulic oil that is supplied to the arm cylinder 15. The first hydraulic oil is supplied to either one of a bottom side oil chamber 151 in the arm cylinder 15 or a head side oil chamber 152 in the arm cylinder 15 by the arm switching valve 36 switching the supply direction of the first hydraulic oil. Due to this, the arm cylinder 15 expands and contracts. In addition, it is also possible for the arm switching valve 36 to select a neutral state where the first hydraulic oil is not supplied to either of the bottom side oil chamber 151 or the head side oil chamber 152.

For example, when a pilot pressure is applied to the first pilot port p1 of the arm switching valve 36, the arm switching valve 36 switches the supply direction of the first hydraulic oil, such that the first hydraulic oil is supplied from the second hydraulic pump 32 to the head side oil chamber 152 of the arm cylinder 15. In addition, when the pilot pressure is applied to the second pilot port p2 of the arm switching valve 36, the arm switching valve 36 switches the supply direction of the first hydraulic oil, such that the first hydraulic oil is supplied from the second hydraulic pump 32 to the bottom side oil chamber 151 of the arm cylinder 15.

Here, when the first hydraulic oil is supplied to the bottom side oil chamber 151, the first hydraulic oil inside the head side oil chamber 152 is discharged to the tank 35. As a result, the arm cylinder 15 extends. On the other hand, when the first hydraulic oil is supplied to the head side oil chamber 152, the first hydraulic oil inside the bottom side oil chamber 151 is discharged to the tank 35. As a result, the arm cylinder 15 contracts.

The boom switching valve 37 is configured to switch the supply direction of the first hydraulic oil that is supplied to the boom cylinder 14. The first hydraulic oil is supplied to either one of a bottom side oil chamber 141 in the boom cylinder 14 or a head side oil chamber 142 in the boom cylinder 14 by the boom switching valve 37 switching the supply direction of the first hydraulic oil. Due to this, the boom cylinder 14 expands and contracts. In addition, it is also possible for the boom switching valve 37 to select a neutral state where the first hydraulic oil is not supplied to either of the bottom side oil chamber 141 or the head side oil chamber 142.

For example, when the pilot pressure is applied to the first pilot port p1 of the boom switching valve 37, the boom switching valve 37 switches the supply direction of the first hydraulic oil such that the first hydraulic oil is supplied from the first hydraulic pump 31 to the bottom side oil chamber 141 of the boom cylinder 14. In addition, when the pilot pressure is applied to the second pilot port p2 of the boom switching valve 37, the boom switching valve 37 switches the supply direction of the first hydraulic oil such that the first hydraulic oil is supplied from the first hydraulic pump 31 to the head side oil chamber 142 of the boom cylinder 14.

Here, when the first hydraulic oil is supplied to the bottom side oil chamber 141, the first hydraulic oil inside the head side oil chamber 142 is discharged to the tank 35. As a result, the boom cylinder 14 extends. On the other hand, when the first hydraulic oil is supplied to the head side oil chamber 142, the first hydraulic oil inside the bottom side oil chamber 141 is discharged to the tank 35. As a result, the boom cylinder 14 contracts.

The bucket switching valve 38 is configured to switch the supply direction of the first hydraulic oil that is supplied to the bucket cylinder 16. The first hydraulic oil is supplied to either one of a bottom side oil chamber 161 in the bucket cylinder 16 or a head side oil chamber 162 in the bucket cylinder 16 by the bucket switching valve 38 switching the supply direction of the first hydraulic oil. Due to this, the bucket cylinder 16 expands and contracts. In addition, it is also possible for the bucket switching valve 38 to select a neutral state where the first hydraulic oil is not supplied to either of the bottom side oil chamber 161 or the head side oil chamber 162.

For example, when a pilot pressure is applied to the first pilot port p1 of the bucket switching valve 38, the bucket switching valve 38 switches the supply direction of the first hydraulic oil such that the first hydraulic oil is supplied from the first hydraulic pump 31 to the head side oil chamber 162 of the bucket cylinder 16. In addition, when a pilot pressure is applied to the second pilot port p2 of the bucket switching valve 38, the bucket switching valve 38 switches the supply direction of the first hydraulic oil such that the first hydraulic oil is supplied from the first hydraulic pump 31 to the bottom side oil chamber 161 of the bucket cylinder 16.

Here, when the first hydraulic oil is supplied to the bottom side oil chamber 161, the first hydraulic oil inside the head side oil chamber 162 is discharged to the tank 35. As a result, the bucket cylinder 16 extends. On the other hand, when the first hydraulic oil is supplied to the head side oil chamber 162, the first hydraulic oil inside the bottom side oil chamber 161 is discharged to the tank 35. As a result, the bucket cylinder 16 contracts.

The left traveling switching valve 40 is configured to switch the supply direction of the first hydraulic oil that is supplied to the traveling motor 18. The right traveling switching valve 39 is configured to switch the supply direction of the first hydraulic oil which is supplied to the traveling motor 17.

Each of the pilot pressure control valves 41 to 48 is configured to control the pilot pressure for driving the respective switching valves 36 to 40.

The first pilot pressure control valve 41 controls the pilot pressure that is applied to the second pilot port p2 of the boom switching valve 37. The second pilot pressure control valve 42 controls the pilot pressure that is applied to the first pilot port p1 of the boom switching valve 37. The third pilot pressure control valve 43 controls the pilot pressure that is applied to the second pilot port p2 of the bucket switching valve 38. The fourth pilot pressure control valve 44 controls the pilot pressure that is applied to the first pilot port p1 of the bucket switching valve 38.

The fifth pilot pressure control valve 45 controls the pilot pressure that is applied to the first pilot port p1 of the arm switching valve 36. The sixth pilot pressure control valve 46 controls the pilot pressure that is applied to the second pilot port p2 of the arm switching valve 36. The seventh pilot pressure control valve 47 controls the pilot pressure that is applied to a first pilot port of a motor switching valve (not shown). The eighth pilot pressure control valve 48 controls the pilot pressure that is applied to a second pilot port of a motor switching valve (not shown).

Each of the pilot pressure control valves 41 to 48 respectively has a pump port p3, a tank port p4, and a supply port p5. Each of the pump ports p3 is connected with a pump flow path 21. Each of the tank ports p4 is connected with a tank flow path 22. Each of the supply ports p5 is connected with each upstream pilot flow path 51 to 58, which will be described later. The pump flow path 21 and the tank flow path 22 are connected with the tank 35.

The third hydraulic pump 33 is installed in the pump flow path 21. The third hydraulic pump 33 discharges the second hydraulic oil to each of the pilot pressure control valves 41 to 48 via the pump flow path 21. The third hydraulic pump 33 is a pump, which is separate to the first hydraulic pump 31 and the second hydraulic pump 32 described above. However, the first hydraulic pump 31 or the second hydraulic pump 32 may be used instead of the third hydraulic pump 33.

Each of the pilot pressure control valves 41 to 48 is able to switch between an output state and a discharge state. When each of the pilot pressure control valves 41 to 48 is in the output state, the pump port p3 and the supply port p5 are linked. In addition, when each of the pilot pressure control valves 41 to 48 is in the discharge state, the tank port p4 and the supply port p5 are linked.

Each of the upstream pilot flow paths 51 to 56 is a flow path that connects the respective pilot pressure control valves 41 to 46 and the respective electromagnetic proportional valves 71 to 76. Here, each of the upstream pilot flow paths 51 to 56 are connected with the supply ports p5 of the respective pilot pressure control valves 41 to 46.

Each downstream pilot flow path 81 to 86 is a flow path that connects the respective electromagnetic proportional valves 71 to 76 and the respective switching valves 36 to 40. Here, each of the downstream pilot flow paths 81 to 86 is connected with the first or second pilot ports p1 and p2 of the respective switching valves 36 to 40.

In detail, the first upstream pilot flow path 51 connects the supply port p5 of the first pilot pressure control valve 41 and the first electromagnetic proportional valve 71. The first downstream pilot flow path 81 connects the first electromagnetic proportional valve 71 and the second pilot port p2 of the boom switching valve 37. The second upstream pilot flow path 52 connects the supply port p5 of the second pilot pressure control valve 42 and the second electromagnetic proportional valve 72. The second downstream pilot flow path 82 connects the second electromagnetic proportional valve 72 and the first pilot port p1 of the boom switching valve 37.

The third upstream pilot flow path 53 connects the supply port p5 of the third pilot pressure control valve 43 and the third electromagnetic proportional valve 73. The third downstream pilot flow path 83 connects the third electromagnetic proportional valve 73 and the second pilot port p2 of the bucket switching valve 38. The fourth upstream pilot flow path 54 connects the supply port p5 of the fourth pilot pressure control valve 44 and the fourth electromagnetic proportional valve 74. The fourth downstream pilot flow path 84 connects the fourth electromagnetic proportional valve 74 and the first pilot port p1 of the bucket switching valve 38.

The fifth upstream pilot flow path 55 connects the supply port p5 of the fifth pilot pressure control valve 45 and the fifth electromagnetic proportional valve 75. The fifth downstream pilot flow path 85 connects the fifth electromagnetic proportional valve 75 and the first pilot port p1 of the arm switching valve 36. The sixth upstream pilot flow path 56 connects the supply port p5 of the sixth pilot pressure control valve 46 and the sixth electromagnetic proportional valve 76. The sixth downstream pilot flow path 86 connects the sixth electromagnetic proportional valve 76 and the second pilot port p2 of the arm switching valve 36.

The seventh upstream pilot flow path 57 connects the supply port p5 of the seventh pilot pressure control valve 47 and the first pilot port of the motor switching valve. The eighth upstream pilot flow path 58 connects the supply port p5 of the eighth pilot pressure control valve 48 and the second pilot port of the motor switching valve.

The ninth upstream pilot flow path 59 connects the third hydraulic pump 33 and the seventh electromagnetic proportional valve 77. The ninth downstream pilot flow path 89 connects the seventh electromagnetic proportional valve 77 and the second downstream pilot flow path 82. Here, the ninth downstream pilot flow path 89 is connected with the second downstream pilot flow path 82 via a shuttle valve 80. The flow path on the high pressure side out of the second downstream pilot flow path 82 and the ninth downstream pilot flow path 89 supplies the second hydraulic oil to the first pilot port p1 of the boom switching valve 37 via the shuttle valve 80.

The first and second operation levers 117 and 118 are members for operating each of the pilot pressure control valves 41 to 48.

The first operation lever 117 is connected with the first to fourth pilot pressure control valves 41 to 44. The first to fourth pilot pressure control valves 41 to 44 are arranged to correspond to the forward, backward, left, and right movements of the first operation lever 117.

The second operation lever 118 is connected with the fifth to eighth pilot pressure control valve 45 to 48. The fifth to eighth pilot pressure control valves 45 to 48 are arranged to correspond to the forward, backward, left, and right movements of the second operation lever 118.

The first to fourth pilot pressure control valves 41 to 44 are switched between the output state and the discharge state by the operator operating the first operation lever 117. In addition, the fifth to eighth pilot pressure control valves 45 to 48 are switched between the output state and the discharge state by the operator operating the second operation lever 118.

When each of the pilot pressure control valves 41 to 48 is in the output state, the second hydraulic oil is supplied to each of the upstream pilot flow paths 51 to 58 via the respective supply ports p5 at a pressure that corresponds to the operation amount of the first or second operation levers 117 and 118.

When each of the pilot pressure control valves 41 to 48 is in the discharge state, the second hydraulic oil inside each of the upstream pilot flow paths 51 to 58 is discharged to the tank 35 via the respective supply ports p5, the tank port p4, and the tank flow path 22.

In detail, the first pilot pressure control valve 41 and the second pilot pressure control valve 42 are a pair. The first pilot pressure control valve 41 and the second pilot pressure control valve 42 correspond to the operation directions of the first operation lever 117 which are in the opposite orientation to each other. In addition, the third pilot pressure control valve 43 and the fourth pilot pressure control valve 44 are a pair. The third pilot pressure control valve 43 and the fourth pilot pressure control valve 44 correspond to the operation direction of the first operation lever 117, which are in the opposite orientation to each other.

For example, the first pilot pressure control valve 41 is in the output state when the first operation lever 117 is tilted in the forward direction and the second pilot pressure control valve 42 is in the output state when the first operation lever 117 is tilted in the backward direction. Here, the output state of the first pilot pressure control valve 41 and the output state of the second pilot pressure control valve 42 are alternatively selected using the first operation lever 117. The second pilot pressure control valve 42 is in the discharge state when the first pilot pressure control valve 41 is in the output state. In addition, the first pilot pressure control valve 41 is in the discharge state when the second pilot pressure control valve 42 is in the output state.

In the same manner, the third pilot pressure control valve 43 is in the output state when the first operation lever 117 is tilted in the right direction and the fourth pilot pressure control valve 44 is in the output state when the first operation lever 117 is tilted in the left direction. Here, the output state of the third pilot pressure control valve 43 and the output state of the fourth pilot pressure control valve 44 are alternatively selected using the first operation lever 117. The fourth pilot pressure control valve 44 is in the discharge state when the third pilot pressure control valve 43 is in the output state. In addition, the third pilot pressure control valve 43 is in the discharge state when the fourth pilot pressure control valve 44 is in the output state.

In addition, the fifth pilot pressure control valve 45 and the sixth pilot pressure control valve 46 are a pair. The fifth pilot pressure control valve 45 and the sixth pilot pressure control valve 46 correspond to the operation direction of the second operation lever 118, which are in the opposite orientation to each other. The seventh pilot pressure control valve 47 and the eighth pilot pressure control valve 48 are a pair. The seventh pilot pressure control valve 47 and the eighth pilot pressure control valve 48 correspond to the operation direction of the second operation lever 118, which are in the opposite orientation to each other.

For example, the fifth pilot pressure control valve 45 is in the output state when the second operation lever 118 is tilted in the left direction and the sixth pilot pressure control valve 46 is in the output state when the second operation lever 118 is tilted in the right direction. Here, the output state of the fifth pilot pressure control valve 45 and the output state of the sixth pilot pressure control valve 46 are alternatively selected using the second operation lever 118. The sixth pilot pressure control valve 46 is in the discharge state when the fifth pilot pressure control valve 45 is in the output state. In addition, the fifth pilot pressure control valve 45 is in the discharge state when the sixth pilot pressure control valve 46 is in the output state.

In the same manner, the seventh pilot pressure control valve 47 is in the output state when the second operation lever 118 is tilted in the forward direction and the eighth pilot pressure control valve 48 is in the output state when the second operation lever 118 is tilted in the backward direction. Here, the output state of the seventh pilot pressure control valve 47 and the output state of the eighth pilot pressure control valve 48 are alternatively selected using the second operation lever 118. The eighth pilot pressure control valve 48 is in the discharge state when the seventh pilot pressure control valve 47 is in the output state. In addition, the seventh pilot pressure control valve 47 is in the discharge state when the eighth pilot pressure control valve 48 is in the output state.

Each of the electromagnetic proportional valves 71 to 76 is installed between the respective switching valves 36 to 38 and the respective pilot pressure control valves 41 to 46. Each of the electromagnetic proportional valves 71 to 76 is connected with the respective pilot pressure control valves 41 to 46 via the respective upstream pilot flow paths 51 to 56. In addition, each of the electromagnetic proportional valves 71 to 76 is connected with the respective switching valves 36 to 38 via the respective downstream pilot flow paths 81 to 86.

Each of the electromagnetic proportional valves 71 to 76 is controlled using a current that is output from the control section 20. In detail, the degree of opening of each of the electromagnetic proportional valves 71 to 76 is controlled according to a current value of the current that is output from the control section 20. As a result, the hydraulic pressure of the second hydraulic oil that is output from each of the electromagnetic proportional valves 71 to 76 is controlled depending on instructions from the control section 20.

The seventh electromagnetic proportional valve 77 is installed between the third hydraulic pump 33 and the boom switching valve 37. The seventh electromagnetic proportional valve 77 is connected with the third hydraulic pump 33 via the ninth upstream pilot flow path 59. In addition, the seventh electromagnetic proportional valve 77 is connected with the second downstream pilot flow path 82 via the ninth downstream pilot flow path 89. The seventh electromagnetic proportional valve 77 is controlled by the current which is output from the control section 20. In detail, the degree of opening of the seventh electromagnetic proportional valve 77 is controlled according to a current value of the current that is output from the control section 20.

Each of the hydraulic sensors 61 to 66 is configured to detect the hydraulic pressure of the second hydraulic oil inside the respective upstream pilot flow paths 51 to 56. That is, each of the hydraulic sensors 61 to 66 is configured to detect the hydraulic pressure of the second hydraulic oil that is discharged from the respective pilot pressure control valves 41 to 46 to the respective electromagnetic proportional valves 71 to 76.

In detail, the first hydraulic pressure sensor 61 is installed in the first upstream pilot flow path 51 and is configured to detect the hydraulic pressure of the second hydraulic oil inside the first upstream pilot flow path 51. The second hydraulic pressure sensor 62 is installed in the second upstream pilot flow path 52 and is configured to detect the hydraulic pressure of the second hydraulic oil inside the second upstream pilot flow path 52. The third hydraulic pressure sensor 63 is installed in the third upstream pilot flow path 53 and is configured to detect the hydraulic pressure of the second hydraulic oil inside the third upstream pilot flow path 53.

The fourth hydraulic pressure sensor 64 is installed in the fourth upstream pilot flow path 54 and is configured to detect the hydraulic pressure of the second hydraulic oil inside the fourth upstream pilot flow path 54. The fifth hydraulic pressure sensor 65 is installed in the fifth upstream pilot flow path 55 and is configured to detect the hydraulic pressure of the second hydraulic oil inside the fifth upstream pilot flow path 55. The sixth hydraulic pressure sensor 66 is installed in the sixth upstream pilot flow path 56 and is configured to detect the hydraulic pressure of the second hydraulic oil inside the sixth upstream pilot flow path 56.

Each of the hydraulic pressure sensors 61 to 66 outputs detection results to the control section 20 as a hydraulic pressure signal. Here, the hydraulic pressure signal is an electrical signal that depends on the hydraulic pressure that is detected by each of the hydraulic pressure sensors 61 to 66.

The control section 20 is configured to select at least one item of current value information from a plurality of items of current value information on the basis of the hydraulic pressure that is detected by each of the hydraulic pressure sensors 61 to 66. The control section 20 is configured to set the current value of the current that is output to each of the electromagnetic proportional valves 71 to 76 on the basis of the at least one item of current value information that is selected. Here, the current value information expresses a correspondence relationship between the current value of the current that is output to each of the electromagnetic proportional valves 71 to 76 and the hydraulic pressure of the second hydraulic oil that is output from each of the electromagnetic proportional valves 71 to 76 as shown in FIG. 6.

In detail, the control section 20 selects at least one item of current value information from the plurality of items of current value information on the basis of the hydraulic pressure that is detected by the first hydraulic pressure sensor 61 when the current value of the current that is output to the first electromagnetic proportional valve 71 is set. The control section 20 selects at least one item of current value information from the plurality of items of current value information on the basis of the hydraulic pressure that is detected by the second hydraulic pressure sensor 62 when the current value of the current that is output to the second electromagnetic proportional valve 72 is set. The control section 20 selects at least one item of current value information from the plurality of items of current value information on the basis of the hydraulic pressure that is detected by the third hydraulic pressure sensor 63 when the current value of the current that is output to the third electromagnetic proportional valve 73 is set.

The control section 20 selects at least one item of current value information from the plurality of items of current value information on the basis of the hydraulic pressure that is detected by the fourth hydraulic pressure sensor 64 when the current value of the current that is output to the fourth electromagnetic proportional valve 74 is set. The control section 20 selects at least one item of current value information from the plurality of items of current value information on the basis of the hydraulic pressure that is detected by the fifth hydraulic pressure sensor 65 when the current value of the current that is output to the fifth electromagnetic proportional valve 75 is set. The control section 20 selects at least one item of current value information from the plurality of items of current value information on the basis of the hydraulic pressure that is detected by the sixth hydraulic pressure sensor 66 when the current value of the current that is output to the sixth electromagnetic proportional valve 76 is set.

Figure 6:
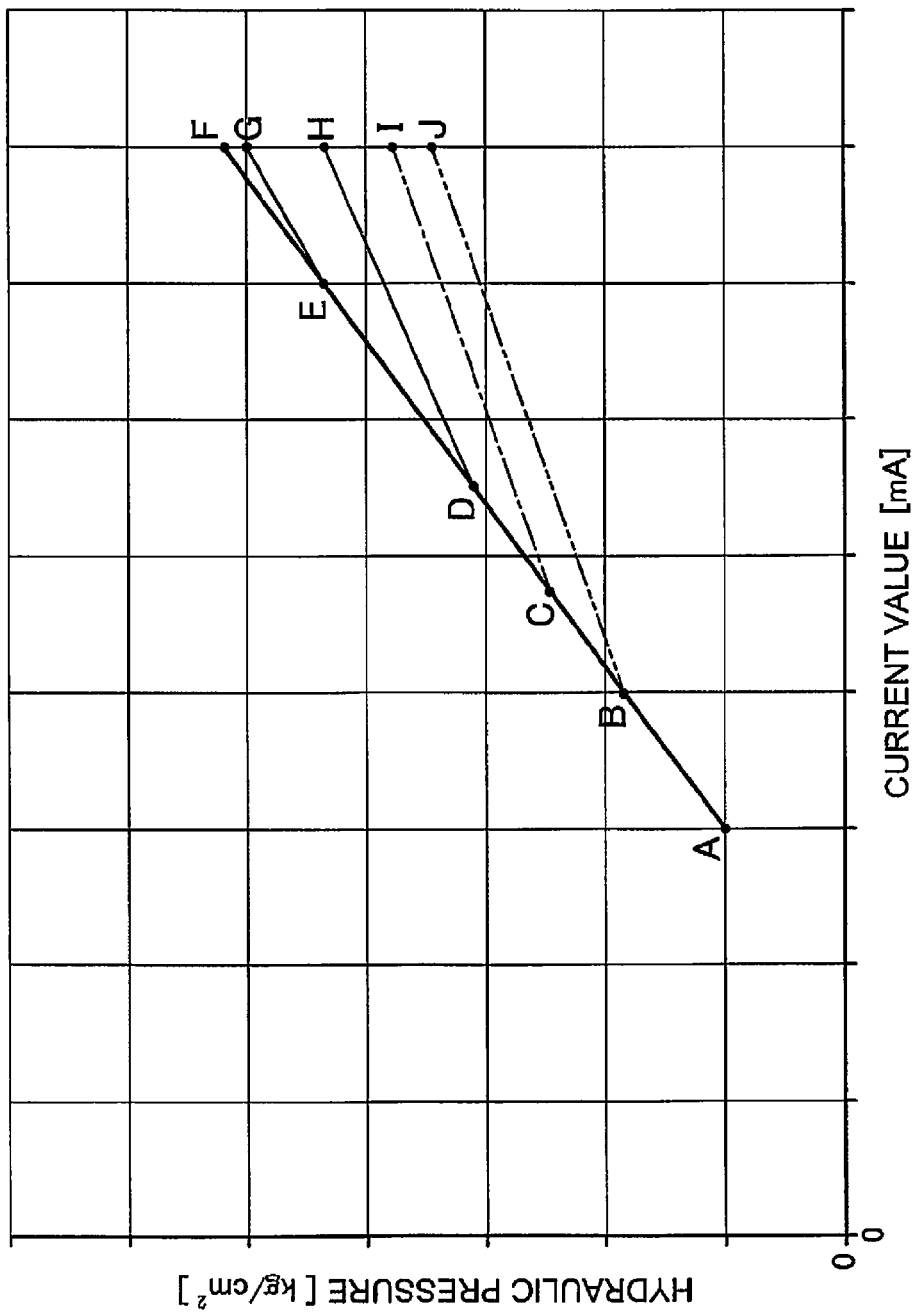
FIG. 6 is a graph illustrating first to fifth items of current value information.

The control section 20 stores a plurality of items of current value information as shown in FIG. 6. Each item of current value information is set for every hydraulic pressure of the second hydraulic oil that is input into each of the electromagnetic proportional valves 71 to 76 (an example of the specific pressure of the present invention). For example, the control section 20 stores first to fifth items of current value information. The control section 20 selects at least one item of current value information from the first to fifth items of current value information. Here, FIG. 6 is a graph illustrating the first to fifth items of current value information. The horizontal axis of the graph in FIG. 6 indicates the current value of the current that is output to each of the electromagnetic proportional valves 71 to 76. In addition, the vertical axis of the graph in FIG. 6 indicates the hydraulic pressure of the second hydraulic oil that is output by each of the electromagnetic proportional valves 71 to 76 to the first and second pilot ports p1 and p2.

For example, the straight line that joins point A and point F indicates the first item of current value information in FIG. 6. The straight line that joins point A and point E and the straight line that joins point E and point G indicate the second item of current value information in FIG. 6. The straight line that joins point A and point D and the straight line that joins point D and point H indicate the third item of current value information in FIG. 6. The straight line which joins point A and point C and the straight line that joins point C and point I indicate the fourth item of current value information FIG. 6. The straight line that joins point A and point B and the straight line that joins point B and point J indicate the fifth item of current value information in FIG. 6.

The control section 20 selects the first item of current value information when the hydraulic pressure that is detected by each of the hydraulic sensors 61 to 66 is a first hydraulic pressure. The control section 20 selects the second item of current value information when the hydraulic pressure that is detected by each of the hydraulic sensors 61 to 66 is a second hydraulic pressure. The control section 20 selects the third item of current value information when the hydraulic pressure that is detected by each of the hydraulic sensors 61 to 66 is a third hydraulic pressure. The control section 20 selects the fourth item of current value information when the hydraulic pressure that is detected by each of the hydraulic sensors 61 to 66 is a fourth hydraulic pressure. The control section 20 selects the fifth item of current value information when the hydraulic pressure that is detected by each of the hydraulic sensors 61 to 66 is a fifth hydraulic pressure.

For example, there are, in order of increasing hydraulic pressure, the first hydraulic pressure, the second hydraulic pressure, the third hydraulic pressure, the fourth hydraulic pressure, and the fifth hydraulic pressure. As shown in FIG. 6, while the first item of current value information is a straight line from point A to point B, the second to fifth items of current value information are expressed as lines that are configured by two straight lines with different inclinations. That is, the second to fifth items of current value information are bent at a certain point. For example, the second item of current value information is bent at point E, the third item of current value information is bent at point D, the fourth item of current value information is bent at point C, and the fifth item of current value information is bent at point B. The hydraulic pressure at point B to point E where bending occurs is smaller in order of the second item of current value information, the third item of current value information, the fourth item of current value information, and the fifth item of current value information. That is, as the hydraulic pressure that is detected by each of the hydraulic pressure sensors 61 to 66 is smaller, the control section 20 selects the current value information where the hydraulic pressure at the bending points described above is smaller.

The control section 20 sets the current value using linear interpolation of the current value of the current that is output to each of the electromagnetic proportional valves 71 to 76 when the hydraulic pressure that is detected by each of the hydraulic pressure sensors 61 to 66 is not the first to fifth hydraulic pressures. In a case where, for example, the hydraulic pressure that is detected by each of the hydraulic pressure sensors 61 to 66 is between the first hydraulic pressure and the second hydraulic pressure, the control section 20 sets the current value of the current, which is output to each of the electromagnetic proportional valves 71 to 76, using linear interpolation based on the first item of current value information and the second item of current value information. In detail, the control section 20 sets the current value of the current, which is output to each of the electromagnetic proportional valves 71 to 76, using linear interpolation of the current value which is set based on the first item of current value information and the current value that is set based on the second item of current value information. Here, each of the items of current value information is common to each of the electromagnetic proportional valves 71 to 76, but the present invention is not particularly limited to this. For example, each of the items of current value information may be different for each of the electromagnetic proportional valves 71 to 76. In addition, the control section 20 is configured to also output the current to the seventh electromagnetic proportional valve 77.

In addition, the control section 20 estimates the operation speed and the like of each of the hydraulic pressure actuators on the basis of the hydraulic pressure that is detected by each of the hydraulic pressure sensors 61 to 66. For example, the control section 20 estimates the operation speed of the arm 12 on the basis of the hydraulic pressure that is detected by the sixth hydraulic pressure sensor 66.

Next, a method where leveling work is performed by the hydraulic excavator 100 described above will be described. In detail, work of leveling terrain along the designed surface S as shown in FIG. 4 will be described.

Firstly, the operator lowers the boom 11 while carrying out an excavation operation with the arm 12 by operating the first operation lever 117 and the second operation lever 118. Here, when the arm 12 carries out the excavation operation, the cutting edge 131 of the bucket 13 follows a circular trajectory. As a result, in a case where the designed surface S is a planar surface, it is necessary for the operator to lower the boom 11 while carrying out the excavation operation with the arm 12.

In detail, the operator carries out the excavation operation with the arm 12 by operating the second operation lever 118. That is, the sixth pilot pressure control valve 46 is set to the output state by the operator operating the second operation lever 118. As a result, the second hydraulic oil is supplied to the arm switching valve 36 with a pressure that depends on the operation amount of the second operation lever 118. A pilot pressure is applied to the second pilot port p2 of the arm switching valve 36 using the second hydraulic oil that is supplied to the arm switching valve 36. As a result, the excavation operation with the arm 12 is performed.

In addition, the operator lowers the boom 11 by operating the first operation lever 117 at the same time as the excavation operation with the arm 12. That is, the first pilot pressure control valve 41 is set to the output state by the operator operating the first operation lever 117. As a result, the second hydraulic oil is supplied to the boom switching valve 37 with a pressure that depends on the operation amount of the first operation lever 117. A pilot pressure is applied to the second pilot port p2 of the boom switching valve 37 using the second hydraulic oil that is supplied to the boom switching valve 37. As a result, the boom 11 is lowered.

Here, it is possible for the control section 20 to forcibly raise the boom 11 to prevent the cutting edge 131 of the bucket 13 from being moved downward and digging past the designed surface S. In detail, when the control section 20 determines that there is a high possibility that the cutting edge 131 of the bucket 13 will move below the designed surface S, the control section 20 controls the first electromagnetic proportional valve 71 and the seventh electromagnetic proportional valve 77. That is, the control section 20 sets the first electromagnetic proportional valve 71 to a closed state by controlling the current value of the current that is output to the first electromagnetic proportional valve 71. In addition, the control section 20 sets the seventh electromagnetic proportional valve 77 to an open state.

Due to this, the hydraulic pressure of the second hydraulic oil that is discharged from the third hydraulic pump 33 is applied from the third hydraulic pump 33 to the shuttle valve 80. As a result, the shuttle valve 80 links the ninth downstream pilot flow path 89 and the second downstream pilot flow path 82. As such, the hydraulic pressure of the second hydraulic oil that is discharged from the third hydraulic pump 33 is applied to the first pilot port p1 of the boom switching valve 37. Due to this, the boom 11 is raised.

Here, it is also possible for the control section 20 to control each of the electromagnetic proportional valves 72 to 76 other than the first electromagnetic proportional valves 71 and 77. Due to the control section 20 controlling each of the electromagnetic proportional valves 72 to 77, it is possible to operate each of the hydraulic pressure actuators and to stop the operations of each of the hydraulic pressure actuators regardless of the operation of the operator. In addition, due to the control section 20 controlling each of the electromagnetic proportional valves 71 to 77, it is possible to control the operation speed and the operation range of the hydraulic pressure actuators.

Next, the operation of the control section 20 during the excavation operation with the arm 12 will be described with reference to FIG. 7. Here, FIG. 7 is a flow chart illustrating the operation of the control section 20.

As described above, to perform the excavation operation with the arm 12, the operator sets the sixth pilot pressure control valve 46 to the output state by operating the second operation lever 118. Due to this, the second hydraulic oil that is discharged from the third hydraulic pump 33 is supplied from the sixth pilot pressure control valve 46 to the sixth electromagnetic proportional valve 76. Here, the hydraulic pressure of the second hydraulic oil which is supplied to the sixth upstream pilot flow path 56 corresponds with the operation amount of the second operation lever 118.

The hydraulic pressure of the second hydraulic oil inside the sixth upstream pilot flow path 56 is detected by the sixth hydraulic pressure sensor 66. The sixth hydraulic pressure sensor 66 outputs the detection result to the control section 20 as a hydraulic pressure signal.

Figure 7:
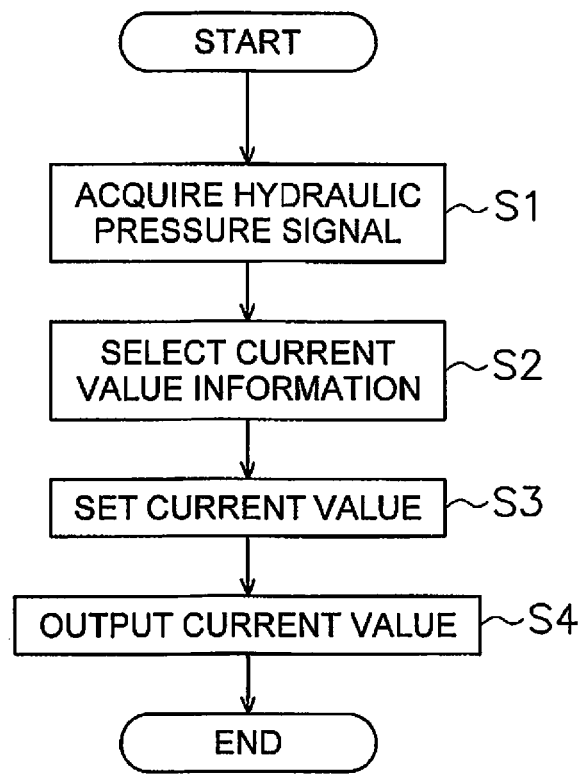
FIG. 7 is a flow chart illustrating an operation of a control section.

As shown in FIG. 7, the control section 20 firstly acquires information that relates to the hydraulic pressure that is detected by the sixth hydraulic pressure sensor 66 (step S1). In detail, the control section 20 acquires the hydraulic pressure signal that is output by the sixth hydraulic pressure sensor 66.

Next, the control section 20 selects at least one item of current value information from the plurality of items of current value information on the basis of the hydraulic pressure signal that is acquired in step S1 (step S2). In detail, the control section 20 stores a plurality of items of current value information as shown in FIGS. 6 to 10. Here, the control section 20 need not store each of the items of current value information. For example, the control section 20 may acquire each of the items of current value information from an external storage apparatus. Then, the control section 20 selects one item of current value information from the plurality of items of current value information on the basis of the hydraulic pressure signal that is acquired in step S1.

Next, the control section 20 sets the current value of the current that is output to the sixth electromagnetic proportional valve 76 on the basis of the current value information which is selected in step S2 (step S3). In detail, the control section 20 sets the current value of the current which is output to the sixth electromagnetic proportional valve 76 on the basis of the at least one item of current value information that is selected in step S2 such that the sixth electromagnetic proportional valve 76 outputs the second hydraulic oil with a hydraulic pressure that is substantially equal to the hydraulic pressure that is detected by the sixth hydraulic pressure sensor 66. In more detail, the current value that is output to the sixth electromagnetic proportional valve 76 is set based on the current value information that is selected by regarding the hydraulic pressure that is detected by the sixth hydraulic pressure sensor 66 as the pressure of the second hydraulic oil that is output from the sixth electromagnetic proportional valve 76.

Next, the control section 20 outputs a current that has the current value that is set in step S3 to the sixth electromagnetic proportional valve 76 (step S4).

Due to the current that is output from the control section 20 to the sixth electromagnetic proportional valve 76 in this manner, the sixth electromagnetic proportional valve 76 outputs the second hydraulic oil to the arm switching valve 36 with a hydraulic pressure that is substantially equal to the hydraulic pressure that is detected by the sixth hydraulic pressure sensor 66. That is, the pilot pressure is applied to the second pilot port p2 of the arm switching valve 36. As a result, the arm switching valve 36 switches the supply direction of the first hydraulic oil from the second hydraulic pump 32. Then, the first hydraulic oil from the second hydraulic pump 32 is supplied to the bottom side oil chamber 151 of the arm cylinder 15.

Here, the control section 20 may also control each of the electromagnetic proportional valves 71 to 75 other than the sixth electromagnetic proportional valve 76 with the same method. That is, the control section 20 selects at least one item of current value information which is selected from the plurality of items of current value information on the basis of the hydraulic pressure that is detected by each of the hydraulic pressure sensors 61 to 66. Then, the control section 20 sets the current value of the current that is output to each of the electromagnetic proportional valves 71 to 75 on the basis of the at least one item of current value information that is selected.

The hydraulic excavator 100 according to the present exemplary embodiment has the following features.

As described above, the control section 20 sets the current value of the current that is output to the sixth electromagnetic proportional valve 76 on the basis of appropriate current value information that corresponds with an input hydraulic pressure. As a result, it is possible for the hydraulic pressure of the second hydraulic oil that is input into the sixth electromagnetic proportional valve 76 to be substantially equal to the hydraulic pressure of the second hydraulic oil that is output from the sixth electromagnetic proportional valve 76. As a result, the operation speed of the arm 12 that is estimated by the control section 20 is substantially equal to the actual operation speed of the arm 12. As a result, in a case where, for example, the control section 20 performs control that raises the boom 11 according to the operation speed of the arm 12, it is possible for the control section 20 to more appropriately control the boom 11.

An exemplary embodiment of the present invention is described above, but the present invention is not limited to this and various modifications are possible without departing from the gist of the present invention.

MODIFIED EXAMPLE 1

In the exemplary embodiment described above, the control section 20 selects at least one item of current value information from five items of current value information, but the number of items of current value information is not particularly limited to this. The control section 20 may, for example, select the at least one item of current value information from less than five items of current value information or may select the at least one item of current value information from six or more items of current value information.

MODIFIED EXAMPLE 2

In the exemplary embodiment described above, the hydraulic excavator 100 where the present invention is applied is described, but it is also possible for the present invention to be applied to other work vehicles, such as a wheel loader or a motor grader.

MODIFIED EXAMPLE 3

In the exemplary embodiments described above, the current value information expresses a correspondence relationship between the current value of the current that is output to each of the electromagnetic proportional valves 71 to 76 and the hydraulic pressure of the second hydraulic oil that is output from each of the electromagnetic proportional valve 71 to 76, but the present invention is not particularly limited to this. For example, the current value information may express a correspondence relationship between the current value of the current that is input into each of the electromagnetic proportional valves 71 to 76 and the hydraulic pressure of the second hydraulic oil that is output from each of the electromagnetic proportional valves 71 or 76.

The invention claimed is:

1. A work vehicle comprising:
    a work implement;
    a switching valve which switches a supply direction of a first hydraulic fluid which is supplied to the work implement;
    an operation member for operating the work implement;
    a pilot pressure control valve which controls pressure of a second hydraulic fluid which drives the switching valve according to an operation amount of the operation member;
    an electromagnetic proportional valve which is installed between the switching valve and the pilot pressure control valve;
    an upstream pilot flow path which connects the pilot pressure control valve and the electromagnetic proportional valve;
    a pressure sensor which detects pressure of the second hydraulic fluid inside the upstream pilot flow path; and
    a control section which selects at least one current value characteristic from among a plurality of current value characteristics on the basis of the pressure which is detected by the pressure sensor, each of the current value characteristics expressing a different correspondence relationship between a current value of a current which is output to the electromagnetic proportional valve and the pressure of the second hydraulic fluid which is output from the electromagnetic proportional valve, the control section setting the current value of the current which is output to the electromagnetic proportional valve on the basis of the at least one current value characteristic which is selected.

2. The work vehicle according to claim 1,
    wherein the control section sets the current value which is output to the electromagnetic proportional valve on the basis of the selected at least one current value characteristic such that the pressure of the second hydraulic fluid which is output from the electromagnetic proportional valve is equal to the pressure which is detected by the pressure sensor.

3. The work vehicle according to claim 2, wherein
    each of the current value characteristics is set with respect to one of a plurality of specific pressures which are input into the electromagnetic proportional valve,
    the control section selects at least one current value characteristic whose corresponding one of the specific pressures is close to the pressure detected by the pressure sensor as the at least one current value characteristic, and the control section sets the current value of the current output to the electromagnetic proportional valve on the basis of the at least one current value characteristic which is selected.

4. The work vehicle according to claim 2, wherein
    the control section is configured to select a first current value characteristic among the plurality of current value characteristics as the at least one current value characteristic when the pressure detected by the pressure sensor is a first pressure, and to select a second current value characteristic among the plurality of current value characteristics as the at least one current value characteristic when the pressure detected by the pressure sensor is a second pressure, and
    the control section sets the current value of the current output to the electromagnetic proportional valve using interpolation when the pressure detected by the pressure sensor is between the first pressure and the second pressure.

5. The work vehicle according to claim 2, wherein
    the work implement has a cylinder which is driven by the first hydraulic fluid, and
    the switching valve is configured to switch the supply direction of the first hydraulic fluid supplied to the cylinder.

6. The work vehicle according to claim 2, further comprising
    a vehicle body,
    the work implement having a boom which is rotatably attached to the vehicle body, an arm which is rotatably attached to the boom, a boom cylinder which drives the boom, and an arm cylinder which drives the arm,
    the first hydraulic fluid being supplied to the arm cylinder, and
    the switching valve being arranged to switch the supply direction of the first hydraulic fluid supplied to the arm cylinder.

7. The work vehicle according to claim 1, wherein
    each of the current value characteristics is set with respect to one of a plurality of specific pressures which are input into the electromagnetic proportional valve,
    the control section selects at least one current value characteristic whose corresponding one of the specific pressures is close to the pressure detected by the pressure sensor as the at least one current value characteristic, and
    the control section sets the current value of the current output to the electromagnetic proportional valve on the basis of the at least one current value characteristic which is selected.

8. The work vehicle according to claim 1,
    wherein the control section is configured to select a first current value characteristic among the plurality of current value characteristics as the at least one current value characteristic when the pressure detected by the pressure sensor is a first pressure, and to select a second current value characteristic among the plurality of current value characteristics as the at least one current value characteristic when the pressure detected by the pressure sensor is a second pressure, and
    the control section sets the current value of the current output to the electromagnetic proportional valve using interpolation when the pressure detected by the pressure sensor is between the first pressure and the second pressure.

9. The work vehicle according to claim 8,
    wherein the control section sets the current value of the current output to the electromagnetic proportional valve using linear interpolation when the pressure detected by the pressure sensor is between the first pressure and the second pressure.

10. The work vehicle according to claim 4, wherein
when the pressure detected by the pressure sensor is between the first pressure and the second pressure, the control section selects the first and second current value characteristics among the plurality of current value characteristics, and sets the current value of the current output to the electromagnetic proportional valve using interpolation of the current value set based on the first current value characteristic and the current value set based on the second current value characteristic.

11. The work vehicle according to claim 1, wherein
the work implement has a cylinder which is driven by the first hydraulic fluid, and
the switching valve is configured to switch the supply direction of the first hydraulic fluid supplied to the cylinder.

12. The work vehicle according to claim 1, further comprising
a vehicle body,
the work implement having a boom which is rotatably attached to the vehicle body, an arm which is rotatably attached to the boom, a boom cylinder which drives the boom, and an arm cylinder which drives the arm,
the first hydraulic fluid being supplied to the arm cylinder, and
the switching valve being arranged to switch the supply direction of the first hydraulic fluid supplied to the arm cylinder.

13. A method for controlling a work implement of a work vehicle, the method comprising the following steps:
(a) acquiring a pressure signal which indicates pressure of a second hydraulic fluid which is supplied from a pilot pressure control valve to an electromagnetic proportional valve;
(b) selecting at least one current value characteristic among a plurality of current value characteristic on the basis of the pressure signal which is acquired in step (a), each of the current value characteristics expressing a different correspondence relationship between a current value of a current output to the electromagnetic proportional valve and pressure of the second hydraulic fluid output from the electromagnetic proportional valve; and
(c) setting the current value of the current output to the electromagnetic proportional valve on the basis of the at least one current value characteristic which is selected in step (b).

14. The control method according to claim 13, further comprising the following steps:
(d) controlling the electromagnetic proportional valve by outputting the current value set in step (c) to the electromagnetic proportional valve;
(e) applying a pilot pressure to a switching valve using the second hydraulic fluid output from the electromagnetic proportional valve controlled in step (d); and
(f) switching a supply direction of a first hydraulic fluid supplied to the work implement on the basis of the pilot pressure which is applied in step (e).

* * * * *